US008675551B2

(12) United States Patent
Xia et al.

(10) Patent No.: US 8,675,551 B2
(45) Date of Patent: Mar. 18, 2014

(54) MULTI-PROTOCOL LABEL SWITCHING SUPPORT FOR PROXY MOBILE INTERNET PROTOCOL VERSION 6

(75) Inventors: Yangsong Xia, Nanjing (CN); Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1094 days.

(21) Appl. No.: 12/397,160

(22) Filed: Mar. 3, 2009

(65) Prior Publication Data

US 2009/0245149 A1  Oct. 1, 2009

Related U.S. Application Data

(60) Provisional application No. 61/041,040, filed on Mar. 31, 2008.

(51) Int. Cl.
*H04W 4/00* (2009.01)
*H04L 12/28* (2006.01)

(52) U.S. Cl.
USPC ........................................... 370/328; 370/401

(58) Field of Classification Search
None
See application file for complete search history.

(56) References Cited

U.S. PATENT DOCUMENTS

| | | | | |
|---|---|---|---|---|
| 6,912,567 B1 * | 6/2005 | Allard et al. | ................... | 709/223 |
| 7,068,640 B2 * | 6/2006 | Kakemizu et al. | ............ | 370/349 |
| 7,136,374 B1 * | 11/2006 | Kompella | ..................... | 370/352 |
| 7,225,238 B1 * | 5/2007 | Dantu et al. | ................... | 709/219 |
| 7,483,411 B2 * | 1/2009 | Weinstein et al. | ............ | 370/338 |
| 7,519,738 B2 * | 4/2009 | Forsberg | ........................ | 709/245 |
| 7,751,399 B2 * | 7/2010 | Martini et al. | ................. | 370/392 |
| 7,809,813 B2 * | 10/2010 | Ma et al. | ......................... | 709/223 |
| 7,852,787 B2 * | 12/2010 | Gelbman et al. | ............... | 370/254 |
| 7,881,198 B2 * | 2/2011 | Monette et al. | ............... | 370/235 |
| 8,040,850 B2 * | 10/2011 | Soliman | ........................ | 370/331 |
| 8,068,486 B2 * | 11/2011 | Liu et al. | ....................... | 370/389 |
| 8,199,717 B2 * | 6/2012 | Krishnan et al. | ............... | 370/331 |
| 2002/0027906 A1 * | 3/2002 | Athreya et al. | ............... | 370/386 |
| 2003/0074452 A1 * | 4/2003 | Zheng et al. | .................. | 709/228 |
| 2003/0172109 A1 * | 9/2003 | Dalton et al. | ................. | 709/203 |
| 2004/0240414 A1 * | 12/2004 | Fan et al. | ....................... | 370/332 |

(Continued)

FOREIGN PATENT DOCUMENTS

CN  1625176 A  6/2005
CN  101053223 A  10/2007

(Continued)

OTHER PUBLICATIONS

Toth et al., U.S. Appl. No. 60/880,957, filed Jan. 18, 2007.*

(Continued)

*Primary Examiner* — Gregory Sefcheck
(74) *Attorney, Agent, or Firm* — Conley Rose, P.C.; Grant Rodolph; Brandt D. Howell

(57) ABSTRACT

A mobility access gateway (MAG) comprising at least one processor configured to implement a method comprising establishing a multi-protocol label switched (MPLS) tunnel with a local mobility agent (LMA), and establishing communications with a plurality of mobile nodes (MNs) associated with a plurality of service providers, wherein a plurality of packets destined for the LMA comprise a label that distinguishes between the service providers. Also disclosed is a method comprising receiving a packet destined for a MN, adding an inner label to the packet, wherein the inner label is associated with the MN, and adding a tunnel label to the packet.

17 Claims, 3 Drawing Sheets

(56) References Cited

U.S. PATENT DOCUMENTS

| | | | |
|---|---|---|---|
| 2005/0129059 A1 | 6/2005 | Jiang et al. | |
| 2005/0152395 A1* | 7/2005 | Hales | 370/465 |
| 2006/0182146 A1* | 8/2006 | Monette et al. | 370/473 |
| 2006/0193248 A1 | 8/2006 | Filsfils et al. | |
| 2007/0091862 A1* | 4/2007 | Ioannidis | 370/338 |
| 2007/0250642 A1* | 10/2007 | Thubert et al. | 709/245 |
| 2008/0130571 A1* | 6/2008 | Maeda et al. | 370/331 |
| 2009/0059866 A1* | 3/2009 | Chen et al. | 370/331 |
| 2009/0274091 A1* | 11/2009 | Zheng | 370/328 |
| 2010/0172293 A1* | 7/2010 | Toth et al. | 370/328 |
| 2010/0202344 A1* | 8/2010 | Kawakami | 370/328 |
| 2012/0099538 A1* | 4/2012 | Venkataswami et al. | 370/329 |

FOREIGN PATENT DOCUMENTS

| | | |
|---|---|---|
| CN | 101120552 A | 2/2008 |
| WO | 2006045356 A1 | 5/2006 |
| WO | 2007052904 A1 | 5/2007 |

OTHER PUBLICATIONS

Andersson, L., et al., "LDP Specification," Network Working Group, RFC 5036, Oct. 2007, 127 pages.

Awduche, D., et al., "RSVP-TE Extensions to RSVP for LSP Tunnels," Network Working Group, RFC 3209, Dec. 2001, 57 pages.

Bradner, S., "Key Words for Use in RFCs to Indicate Requirement Levels," Network Working Group, RFC 2119, Mar. 1997, 3 pages.

Deering, S., et al., "Internet Protocol, Version 6 (IPv6)," Network Working Group, RFC 2460, Dec. 1998, 37 pages.

Dommety, G., "Key and Sequence Number Extensions to GRE," Network Working Group, RFC 2890, Sep. 2000, 7 pages.

Farinacci, D., et al., "Generic Routing Encapsulation (GRE)," Network Working Group, RFC 2784, Mar. 2000, 9 pages.

Gundavelli, S., et al., "Proxy Mobile IPv6," Network Working Group, RFC 5213, Aug. 2008, 8 pages.

Johnson, D., et al., "Mobility Support in IPv6," Network Working Group, RCF 3775, Jun. 2004, 155 pages.

Rosen, E., et al., "MPLS Label Stack Encoding," Network Working Group, RFC 3032, Jan. 2001, 22 pages.

Rosen, E., et al., "Multiprotocol Label Switching Architecture," Network Working Group, RFC 3031, Jan. 2001, 57 pages.

Muhanna, A., et al., "GRE Key Option for Proxy Mobile IPv6," Network Working Group, Internet Draft, draft-ietf-netlmm-grekey-option-02.txt, Nov. 21, 2008, 17 pages.

Muhanna, A., et al., "GRE Key Option for Proxy Mobile IPv6," Network Working Group, Internet Draft, draft-muhanna-netlmm-grekey-option-01.txt, Oct. 10, 2007, 14 pages.

Gundavelli, S., et al., "Proxy mobile IPv6," Netlmm Working Group, Internet Draft, draft-ietf-netlmm-proxymip6-11.txt, Feb. 25, 2008, 80 pages.

Foreign Communication From a Related Counterpart Application—International Search Report and Written Opinion, PCT/CN2009/071106, Jul. 2, 2009, 9 pages.

* cited by examiner

MULTI-PROTOCOL LABEL SWITCHING SUPPORT FOR PROXY MOBILE INTERNET PROTOCOL VERSION 6

CROSS-REFERENCE TO RELATED APPLICATIONS

This application claims priority to U.S. Provisional Application Ser. No. 61/041,040 filed Mar. 31, 2008 by Xia et al. and entitled "MPLS Tunnel Support for Proxy Mobile IPv6," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern wireless access networks, mobile nodes (MNs) allow users to freely move between access points without the user having to configure the MN for each access point. Specifically, when the MN reaches the coverage limit of one access point, the access point hands over the MN to an adjacent access point, typically without any disruption to the MN's service. In Internet Protocol version 6 (IPv6) networks, a process called proxy mobile IPv6 defines a relatively orderly and efficient network-based method for handing off the MN between adjacent access points. Specifically, proxy mobile IPv6 allows a mobility access gateway (MAG) and a local mobility anchor (LMA) track the movements of the MN and initiate the required mobility signaling on behalf of MN. In addition, proxy mobile IPv6 allows the MAG and the LMA to form tunnels between each other so that the MN's traffic can be tunneled between the MAG and LMA.

In some instances, it may be advantageous to differentiate the packet flows between the MAG and the LMA. For example, the MAG may be supporting a plurality of MNs from home networks that have overlapping addresses or address space. Identifying the packet flows associated with the home networks would improve the LMA's ability to process such packets.

SUMMARY

In a first embodiment, the disclosure includes a MAG comprising at least one processor configured to implement a method comprising establishing a multi-protocol label switched (MPLS) tunnel with a LMA, and establishing communications with a plurality of MNs associated with a plurality of service providers, wherein a plurality of packets destined for the LMA comprise a label that distinguishes between the service providers.

In a second embodiment, the disclosure includes a method comprising receiving a packet destined for a MN, adding an inner label to the packet, wherein the inner label is associated with the MN, and adding a tunnel label to the packet.

In a third embodiment, the disclosure includes a network comprising a MAG in communication with a MN and a LMA, wherein the MAG is configured to establish a MPLS tunnel with the LMA and send a plurality of data packets to the LMA via the MPLS tunnel, and wherein the data packets comprise a label that indicates a service provider associated with the MN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system for differentiating data flows in a Proxy Mobile IPv6 network using MPLS tunnels. The MPLS tunnel and the VP labels may be established using a PBU/PBA exchange between the MAG and the LMA, wherein the PBU and/or PBA may comprise the VP label. When data packets are tunneled in an MPLS tunnel between the MAG and the LMA, they may be differentiated using the VP label. Specifically, the VP label may be located between the packet payload and the tunnel label, and as such may not be visible to any intervening label switched routers (LSRs) that process the packet.

Figure 1:
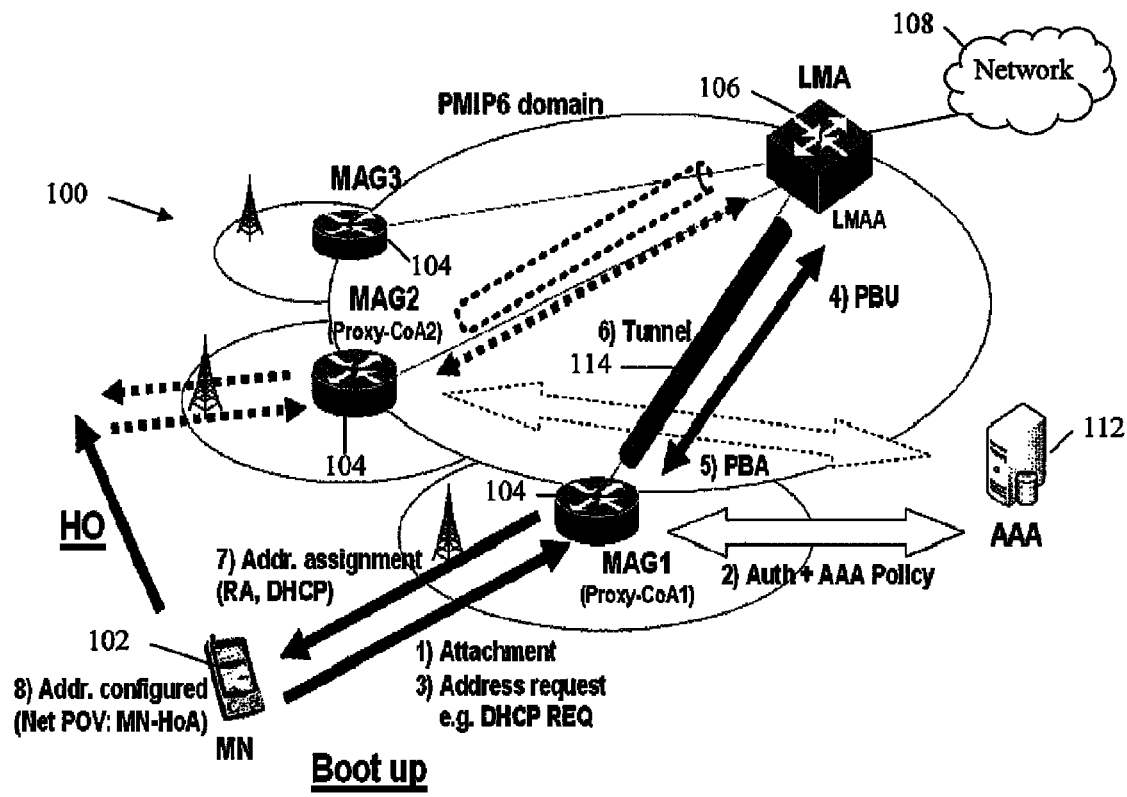
FIG. 1 is a schematic diagram of an embodiment of a wireless system showing the operation of Proxy Mobile IPv6.

FIG. 1 illustrates an embodiment of a wireless system 100. The system 100 may comprise a MN 102, a plurality of MAGs 104, a LMA 106, a network 108, and an authentication, authorization, and accounting (AAA) server 112, all of which are in communication with each other as shown in FIG. 1. The system may be an Internet Protocol (IP) system, such as an IP version 4 (IPv4) system, an IPv6 system as shown in FIG. 1, or combinations thereof. Alternatively, the system may be any other type of wireless system implementing any other suitable protocol. It will be appreciated that FIG. 1 is only one embodiment of the system 100, and that the system 100 may comprise additional components including additional MNs 102, MAGs 104, LMAs 106, networks 108, AAA servers 112, or combinations thereof.

The MN 102 may be any device or component that uses the MAG 104 and/or LMA 106 to communicate with the network 108. Typically, the MN 102 is a mobile user-oriented device that communicates wirelessly with the LMA 106 via the MAG 104, but the MN 102 should not be limited as such. For example, the MNs 102 may be cellular phones, notebook computers, personal digital assistants (PDAs), or any other wireless devices. Alternatively, the MNs 102 may be a component that exchanges data between the system 100 and an external network, such as a wireless router.

The MAGs 104 may be any devices or components that exchange data between the MN 102 and the LMA 106. The MAGs 104 may be routers in that they forward packets that are not explicitly addressed to themselves to other nodes. The MAGs 104 may also perform mobility signaling with the LMA 106 and other MAGs 104 on behalf of MN 102 and/or perform mobility signaling with the MN 102 on behalf of the LMA 106. The MAGs 104 may reside on the access link where the MN 102 is anchored and perform mobility management on behalf of a MN 102. As such, the MAGs 104 may be responsible for detecting the MN's 102 movements on the access links and for sending binding registrations to the LMA 106. In some embodiments, the MAGs 104 may comprise or may be part of a base transceiver station (BTS), a base station controller, or the like, and/or may use such to communicate with the MN 102.

The LMA 106 may be any device or component that allows the MN 102 to communicate with the network 108. The LMA 106 may communicate with the MNs 102 through the MAGs 104 or may communicate directly with the MNs 102. The LMA 106 may be a router in that it forwards packets that are not explicitly addressed to the LMA 106 to other nodes. The LMA 106 may be responsible for maintaining the MN's 102 reachability state and may be the topological anchor point for the MN's 102 home network prefix. In an embodiment, the LMA 106 may comprise or be a part of a Home Agent. As such, the LMA 106 may act as a dynamic host configuration protocol (DHCP) client and/or an AAA client, and may comprise an address cache. In addition, the LMA 106 may handle IP routing for the MNs 102 that may roam into a foreign network.

In an embodiment, the network 108 may be any device, component, or network that exchanges data with the LMA 106. For example, the network 108 may be a Packet Switched Network (PSN), such as a local area network (LAN), a metropolitan area network (MAN), a wide area network (WAN), an intranet, or the Internet. Alternatively, the network 108 may be a circuit switched network, such as a public switched telephone network (PSTN), or any other network.

The AAA server 112 may be any device, component, or network that comprises authentication, authorization, and/or accounting data and/or implements authentication, authorization, and/or accounting functions. The AAA server 112 may communicate with the MN 102, MAGs 104, and/or LMA 106 using any suitable protocol, including IP, RADIUS, and DIAMETER. In an embodiment, at least some of the function performed by the AAA server 112 may instead be performed by a DHCP server.

The components described above may communicate with each other via fixed and/or wireless links using a variety of technologies. The wireless links may be created dynamically when the MN 102 attaches to the LMA 106 directly or through the MAGs 104. The wireless links may be implemented using a multiple access technology, such as Code Division Multiple Access (CDMA), Orthogonal Frequency Division Multiple Access (OFDMA), or Time Division Multiple Access (TDMA). Examples of suitable wireless link technologies include the Internet Engineering Task Force (IETF), Worldwide Interoperability for Microwave Access (WiMAX), Wireless Fidelity (WiFi), Wideband CDMA (WCDMA), Global System for Mobile communications (GSM), Enhanced Data for GSM Evolution (EDGE), Universal Mobile Telecommunication Systems (UMTS), Third Generation Partnership Project (3GPP), Third Generation Partnership Project 2 (3GPP2), Advanced Mobile Phone Service (AMPS), one of the Institute of Electrical and Electronic Engineers (IEEE) 802 wireless networks, such as 802.16d/e, or any other wireless network. The remaining components may be coupled together via fixed links, such as electrical or optical links. Examples of suitable fixed link technologies include IP, Ethernet, Asynchronous Transfer Mode (ATM), Frame Relay, Synchronous Optical Network (SONET), and Synchronous Digital Hierarchy (SDH). The fixed and wireless links may have a fixed bandwidth such that a fixed amount of data is transported over the link, or may have a variable-sized bandwidth.

When the system 100 is a Proxy Mobile IPv6 system, the system 100 may implement an attachment and handover procedure to ensure constant communication between the MN 102 and the network 108. Briefly, the attachment procedure comprises attachment between the MN 102 and a MAG 104. Next, the MAG 104 authenticates the MN 102 using an AAA policy obtained from the AAA server 112. The MN 102 then requests an IP address from the MAG 104, for example using a DHCP request, which causes a proxy binding update (PBU) and proxy binding acknowledgement (PBA) procedure to occur between the MAG 104 and the LMA 106. A communications tunnel 114 is subsequently formed between the MAG 104 and the LMA 106, and the IP Address is conveyed to the MN 102, for example using DHCP. The MN 102 then configures the MN's IP address, known as its home address (HoA), and commences communications with the network 108. Communications from the network 108 to the MN 102 are first routed to the LMA 106, then to the proxy care of address (CoA) at the MAG 104, and then to the HoA in the MN 102. When the MN 102 changes locations sufficient to change the MAG 104 with which it communicates, at least part of the above process may be repeated. Consequently, the communications tunnel 114 may be torn down and a new tunnel may be constructed between the LMA 106 and the new MAG 104 in communication with the MN 102. The MN 102 may be unaware of any of the signaling that occurs between the MAGs 104 and the LMA 106.

In many cases, there may be a plurality of nodes between the MAG and the LMA. The nodes may be LSRs, e.g. they may support MPLS, and as such it may be desirable to establish an MPLS tunnel between the MAG and the LMA. As such, the MAG may be the ingress LSR and the LMA may be the egress LSR, or vice-versa. In any event, the MAG and LMA may use the label distribution protocol (LDP) or any other suitable protocol to establish a label switched path (LSP) between the MAG and the LMA. Briefly, the LDP allows the MAG and LMA to agree upon and exchange the MPLS label associated with the LSP between the MAG and LMA. After the LSP is established, a tunnel label is pushed onto any traffic at the tunnel ingress. The traffic is subsequently transported along the tunnel, and the tunnel label is popped off of the packet at the tunnel egress.

While the LSP can transport packets between the MAG and the LMA, there may be instances where the egress node, e.g. the LMA, needs additional information before the packet can be further processed. For example, the LMA may service a plurality of networks with overlapping IPv4 addresses. The VP label described herein can provide egress LSRs like the LMA with additional information on how to process the packet. The present encapsulation method requires less overhead than Generic Routing Encapsulation (GRE). GRE requires a three-layer stack that comprises 56 bytes. Specifically, the delivery header may be part of the 40-byte IPv6 header and the GRE header is 16 bytes. In contrast, the tunnel label and VP label described herein are only four bytes each, for a total of eight bytes.

Figure 2:
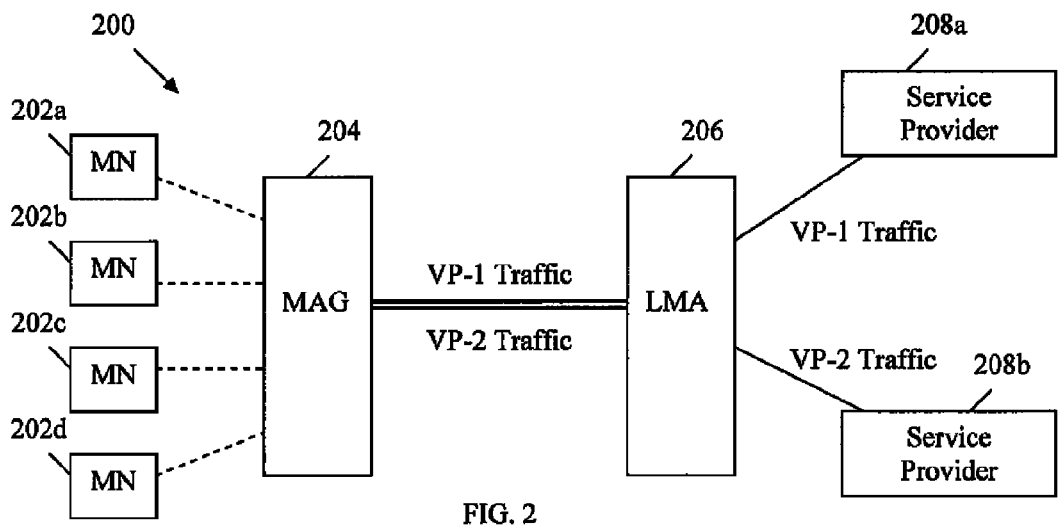
FIG. 2 is a schematic diagram of an embodiment of a wireless system implementing MPLS.

FIG. 2 illustrates one embodiment of a system 200 in which the VP label may be used. The system 200 comprises a plurality of MNs 202a, 202b, 202c, and 202d (collectively, 202) in communication with a MAG 204. The MAG 204 may communicate with a LMA 206 via a virtual connection, such as an MPLS tunnel, which may traverse one or more LSRs. The LMA 206 may communicate with a plurality of service providers 208a and 208b (collectively 208). The MNs 202, MAG 204, LMA 206, and service providers 208 may be substantially similar to the MN 102, MAG 104, LMA 106, and network 108, respectively, described above. In FIG. 2, the MAG 204, LMA 206, and any intermediate LSRs support MPLS routing and may belong to the same MPLS, routing, and/or administrative domain. In addition, the MAG 204 and LMA 206 may be MPLS edge nodes in that they connect a MPLS domain with a node that is outside of the MPLS domain because it does not run MPLS and/or it is in a different domain. In an embodiment, the MAG 204 and the LMA 206 may provide mobility services to the MNs 202 even though the MNs 202 may be from different service providers 208 and are assigned addresses, e.g. IPv4 addresses, from overlapping private address space. For example, MN 202a and MN 202b may be visiting from service provider 208a, and MN 202c and MN 202d may be visiting from service provider 208b. In such a case, it may be advantageous for the MAG 204 and the LMA 206 to be able to distinguish the flows belonging to each service provider 208. As such, the MAG 204 and the LMA 206 may use VP labels to identify the flows belonging to each service provider 208, e.g. VP-1 for service provider 208a and VP-2 for service provider 208b.

Figure 3:
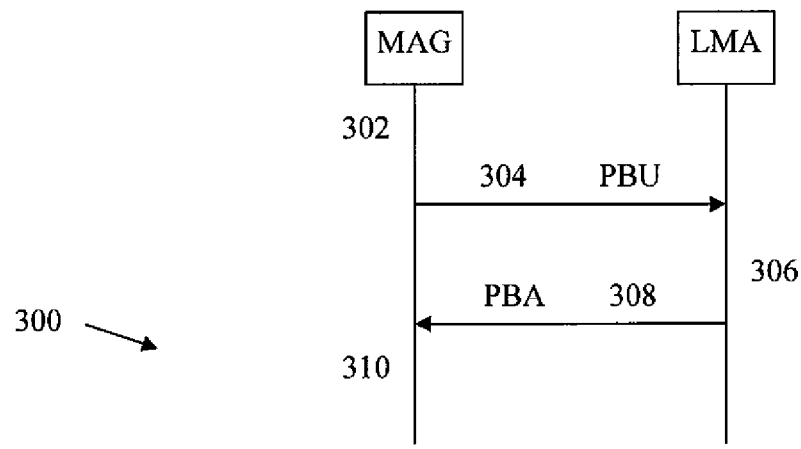
FIG. 3 is a protocol diagram of an embodiment of a Proxy Binding Update (PBU) and Proxy Binding Acknowledgement (PBA) exchange.

FIG. 3 illustrates an embodiment of the protocol 300 between the MAG and the LMA when establishing the VP labels. When a MN enters a Proxy Mobile IPv6 domain and attaches to an access link, the MAG may authenticate the MN and determine if the MN is authorized for network-based mobility management services. If network-based mobility management services should be offered to that MN, the MAG establishes a downstream VP label for the MN at 302. The downstream VP label may be used for differentiating downstream traffic from different service providers. The MAG may then send a PBU message comprising the downstream VP label to the LMA at 304. If desired, the downstream VP label may be configured as a VP label option, which is described in greater detail below.

The LMA may have a Binding Cache Entry (BCE) for each MN that it supports. The BCE may comprise a flag that indicates whether MPLS tunneling is enabled for the MN's traffic. If the LMA accepts the PBU comprising the downstream VP label, the LMA may add the downstream VP label in the BCE for the MN at 306. The LMA may also create an upstream VP label to identify upstream traffic from the MN. The upstream VP label may be based on the MN's profile and/or IP address, and may be the same or different than the downstream VP label. The LMA may then send a PBA message comprising the upstream VP label to the MAG at 308. If desired, the upstream VP label may be configured as the VP label option described below.

The MAG may have a Binding Update List Entry for each MN that it supports. The Binding Update List Entry may comprise a flag that indicates whether MPLS tunneling is enabled for the MN's traffic. If the MAG accepts the PBA comprising the upstream VP label, the MAG may add the upstream VP label in the Binding Update List Entry for the MN at 310. After such an exchange, the downstream and/or upstream VP labels may be used for traffic between the MAC and LMA.

Figure 4:
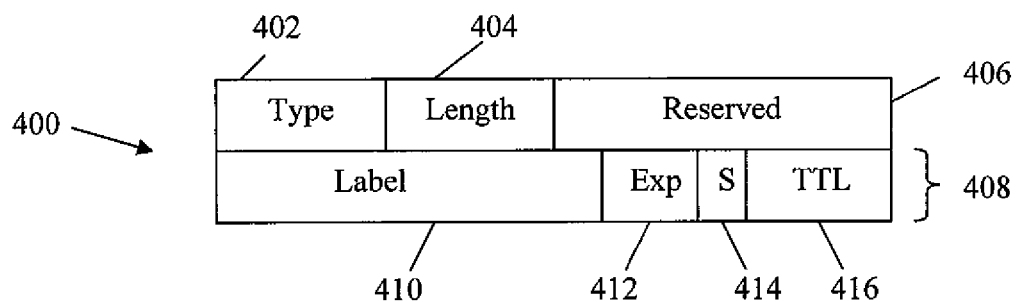
FIG. 4 is a schematic diagram of an embodiment of a virtual pipe (VP) label option.

FIG. 4 illustrates an embodiment of a VP label option 400. The VP label option 400 may be used in the PBU and PBA messages exchanged between the MAG and the LMA. Specifically, the VP label option 400 may used in the PBU to distribute downstream VP labels and/or in the PBA to convey upstream VP labels. The VP label option 400 may comprise a type field 402, a length field 404, a reserved field 406, and a VP label 408. The type field 402 may be may be about 8 bits in length, and may be a unique identifier that distinguishes the VP label option 400 from other types of mobility options, e.g. other type-length-values (TLVs). As such, the type field 402 may be assigned by the Internet Assigned Number Authority (IANA), for example, from the same numbering space as allocated for the other mobility options defined in the Mobile IPv6 specification ("Mobility Support in IPv6" by Johnson et al, IETF RFC 3775, June 2004, incorporated herein by reference). The length field 404 may be about 8 bits in length, and may be an integer that indicates the length in octets of the VP label option 400 excluding the type field 402 and the length field 404. The reserved field 406 may be about 16 bits in length and may be reserved for other purposes. In an embodiment, the value of the reserved field 406 may be initialized to about zero by the sender and/or may be ignored by the receiver.

The VP label 408 may be about 32 bits in length and may be formatted as a MPLS label. As such, the VP label 408 may comprise a label 410, an experimental (Exp) field 412, a bottom of stack (S) bit 414, and a time to live (TTL) field 416. The label 410 may be about 20 bits in length, and may be a value that is unique to each service provider, MN, or both. Persons of ordinary skill in the art are aware of how to allocate unique labels. If desired, a separate label 410 may be created for downstream traffic, e.g. by the MAG, and for upstream traffic, e.g. by the LMA. The experimental field may be about 3 bits in length, may be used for other purposes or ignored, and may be set to zero. The S bit 414 may be about one bit in length and may be used to identify the VP label 408. For example, the S bit 414 may be set to about one to identify the VP label 408 as being at the bottom of the label stack. The TTL field 416 may be about 8 bits in length, and may indicate the distance between the MAG and LMA from a MPLS label processing prospective. For example, the TTL field 416 may be set to about one to indicate that the LMA and the MAG are only one hop away from each other from a VP label processing perspective.

Figure 5:
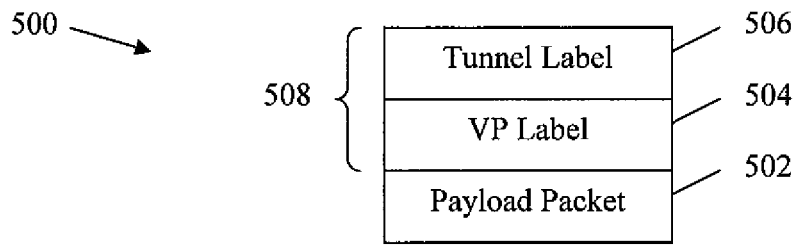
FIG. 5 is a schematic diagram of a packet comprising a VP label.

MPLS encapsulation adds a shim layer between the data link layer headers and any network layer headers. The shim layer may be called a label stack and may comprise one or a plurality of labels. Typically, the labels are pushed onto the packets at a MPLS ingress node, processed at one or more intermediate LSRs, and then popped off of the packets at a MPLS egress node. FIG. 5 illustrates a tunneled packet 500 comprising a payload packet 502 and a label stack 508. The tunneled packet 500 may be an upstream or a downstream packet, and as such the label stack 508 may be pushed onto a payload packet 502 at the MAG or the LMA. The payload packet 502 may be any type of packet that carries data, for example an IPv6 packet, an IPv4 packet, or an IPv4-User Datagram Protocol (UDP) packet. The label stack may comprise a VP label 504 and a tunnel label 506. The VP label 504 may be as described above, and may be used to differentiate payload packets 502 associated with different service providers. The tunnel label 506 may be a conventional four-byte MPLS tunnel label and may be used to route the tunneled packet 500 along the tunnel. The tunnel label 506 may be positioned ahead of the VP label 504, and as such the VP label 504 may not be visible to or readable by any intermediate LSRs that process the tunneled packet 500.

Upstream packets flow from the MN to the MAG and then to the LMA. When an upstream packet reaches the MAG, the MAG may locate a Binding Update List Entry based on MN's address, e.g. its IP address. The MAG may then identify the upstream VP label and the tunnel label associated with the Binding Update List Entry. The MAG may then encapsulate the packet with the VP label and tunnel label to produce the tunneled packet 500, and may send the tunneled packet to the LMA. When the packet arrives at the LMA, the LMA may pop off the tunnel label and analyze the VP label to determine the appropriate service provider. The LMA then may pop off the VP label and may send the packet to the corresponding service provider.

Downstream packets flow from the LMA to the MAG and then to the MN. When a downstream packet reaches the LMA, the LMA may locate a BCE based on MN's address, e.g. its IP address. The LMA may then identify the downstream VP label and the tunnel label associated with the BCE. The LMA may then encapsulate the packet with the VP label and tunnel label to produce the tunneled packet 500, and may send the tunneled packet to the MAG. When the packet arrives at the MAG, the MAG may pop off the tunnel label and the VP label, and may send the packet to the MN.

Figure 6:
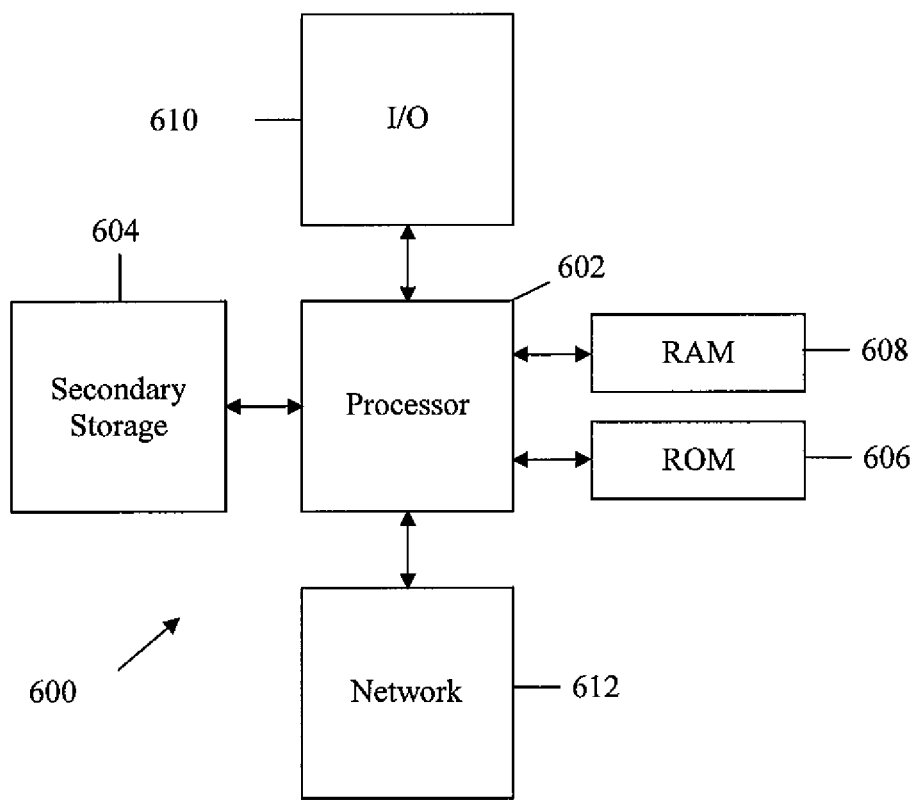
FIG. 6 is an illustration of an embodiment general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers, as defined in the above, is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A mobility access gateway (MAG) comprising:
   at least one processor configured to:
   establish a multi-protocol label switched (MPLS) tunnel with a local mobility anchor (LMA);
   establish communications with a plurality of mobile nodes (MNs) associated with a plurality of service providers; and
   receive a plurality of proxy binding acknowledgement messages from the LMA, wherein the proxy binding acknowledgement messages comprise labels that distinguish between the service providers, wherein the MAG receives a plurality of packets from the MNs and transmits the plurality of packets to the LMA for transmission to one of the plurality of service providers, and wherein the each of the plurality of packets destined for the LMA comprise one of the labels.

2. The MAG of claim 1, wherein the service providers have overlapping address spaces.

3. The MAG of claim 1, wherein the processor is further configured to add the labels to a binding update list entry.

4. The MAG of claim 3, wherein the processor is further configured to set a flag that indicates MPLS tunneling is enabled in the binding update list entry.

5. The MAG of claim 1, wherein the MAG uses the label that distinguishes between service providers to provide mobility service to the MNs, wherein a plurality of the MNs are assigned Internet Protocol (IP) addresses from overlapping private address spaces, and wherein the some of the MNs are assigned IP addresses in IP version four (IPv4) format.

6. The MAG of claim 1, wherein the LMA is responsible for maintaining a reachability state for the MN and is the topological anchor point for a home network prefix for the MN, and wherein the MAG is responsible for detecting movements by the MN movements on access links and for sending binding registrations to the LMA.

7. A method comprising:
receiving a proxy binding update message comprising an inner label from a mobility access gateway (MAG);
receiving a packet destined for a mobile node (MN); and
adding an Multi-Protocol Label Switched (MPLS) label to the packet,
wherein the MPLS label comprises a tunnel label followed by the inner label,
wherein the inner label is associated with the MN and the tunnel label is not associated with the MN,
wherein the MAG is configured to communicate with a plurality of MNs, and
wherein the inner label distinguishes between service providers associated with the MNs.

8. The method of claim 7 further comprising establishing a MPLS tunnel with the MAG.

9. The method of claim 6 further comprising adding the inner label to a binding cache entry.

10. The method of claim 6 further comprising setting a flag that indicates MPLS tunneling is enabled in the binding cache entry.

11. A network comprising:
a mobility access gateway (MAG) in communication with a mobile node (MN) and a local mobility anchor (LMA),
wherein the MAG receives a data packet from the MN,
wherein the MAG is configured to establish a multi-protocol label switched (MPLS) tunnel with the LMA and send the data packet to the LMA via the MPLS tunnel for transmission to a service provider,
wherein the data packet sent to the LMA comprises a label that indicates the service provider associated with the MN, and
wherein MAG receives the label from the LMA in a proxy binding acknowledgement (PBA).

12. The network of claim 11, wherein the LMA comprises a Home Agent.

13. The network of claim 11, wherein the LMA handles IP routing for the MN, and wherein the network is a foreign network to the MN.

14. The network of claim 11, wherein the MAG performs mobility signaling with the LMA on behalf of a MN.

15. The network of claim 11, wherein the MAG is part of a Proxy Mobile Internet Protocol version six (Proxy Mobile IPv6) system.

16. The network of claim 11, wherein the MAG uses the label that indicates a MN's service provider to provide mobility service to a plurality of MNs, and wherein a plurality of the MNs are assigned Internet Protocol (IP) addresses from overlapping private address spaces.

17. The network of claim 11, wherein the LMA is responsible for maintaining a reachability state for the MN and is the topological anchor point for a home network prefix for the MN, and wherein the MAG is responsible for detecting movements by the MN movements on access links and for sending binding registrations to the LMA.

* * * * *

UNITED STATES PATENT AND TRADEMARK OFFICE
CERTIFICATE OF CORRECTION

PATENT NO. : 8,675,551 B2  
APPLICATION NO. : 12/397160  
DATED : March 18, 2014  
INVENTOR(S) : Yangsong Xia and Behcet Sarikaya Page 1 of 1

It is certified that error appears in the above-identified patent and that said Letters Patent is hereby corrected as shown below:

In the Claims:

Column 10/Line 3 should read: "9. The method of claim 7 further comprising adding the"

Column 10/Line 5 should read: "10. The method of claim 7 further comprising setting a flag"

Signed and Sealed this
Tenth Day of June, 2014

Michelle K. Lee
*Deputy Director of the United States Patent and Trademark Office*